US012034306B1

United States Patent
Matheson et al.

(10) Patent No.: US 12,034,306 B1
(45) Date of Patent: Jul. 9, 2024

(54) HYBRID TURBINE AND MULTIPLE-SPOOL ELECTRIC POWER SYSTEM FOR AIRCRAFT

(71) Applicant: The Boeing Company, Arlington, VA (US)

(72) Inventors: Evelyn M. Matheson, Bothell, WA (US); Dorina L. Hester, Bothell, WA (US); Kolten Carrington Miller, Snoqualmie, WA (US); Eugene V. Solodovnik, Kenmore, WA (US); Shengyi Liu, Sammamish, WA (US); Kamiar Karimi, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/165,850

(22) Filed: Feb. 7, 2023

(51) Int. Cl.
*H02J 3/36* (2006.01)
*B64D 27/02* (2006.01)
*B64D 27/24* (2024.01)
*H02J 1/06* (2006.01)
*H02K 7/18* (2006.01)
*H02M 7/537* (2006.01)
*H02P 27/06* (2006.01)

(52) U.S. Cl.
CPC .............. *H02J 3/36* (2013.01); *B64D 27/24* (2013.01); *H02J 1/06* (2013.01); *H02K 7/1815* (2013.01); *H02M 7/537* (2013.01); *H02P 27/06* (2013.01); *B64D 27/026* (2024.01); *B64D 2221/00* (2013.01)

(58) Field of Classification Search
None
See application file for complete search history.

(56) References Cited

U.S. PATENT DOCUMENTS

| 2013/0154359 A1 | 6/2013 | Huang et al. |
| 2015/0123463 A1 | 5/2015 | Huang et al. |
| 2020/0392859 A1 | 12/2020 | Turner |
| 2022/0025820 A1 | 1/2022 | Dalal |

(Continued)

OTHER PUBLICATIONS

European Patent Office, Extended European Search Report Issued in Application No. 23213292.8, May 8, 2024, Germany, 7 pages.

*Primary Examiner* — Jared Fureman
*Assistant Examiner* — Aqeel H Bukhari
(74) *Attorney, Agent, or Firm* — Alleman Hall & Tuttle LLP

(57) ABSTRACT

A hybrid power system for an aircraft. The hybrid power system comprises a high-voltage DC (HVDC) bus and a generator-motor system configured to (1) selectively receive electric power from the HVDC bus to assist in providing propulsion and (2) provide electric power to the HVDC bus during regulated power extraction. An LPS generator/motor is coupled with an LPS shaft of an engine. An HPS generator/motor is coupled with an HPS shaft of the engine. A first AC/DC converter is connected to the LPS generator/motor and the HVDC bus. A second AC/DC converter is connected to the HPS generator/motor, the first AC/DC converter, and the HVDC bus. An electric motor is connected to the HVDC bus and configured to provide propulsion and/or electric power. Further, AC and DC distribution systems are connected to the HVDC bus. A control system is configured to selectively control connections to the HVDC bus.

20 Claims, 14 Drawing Sheets

(56) References Cited

U.S. PATENT DOCUMENTS

2022/0238779 A1* 7/2022 Chong .................. B64D 27/24
2022/0356849 A1   11/2022 Gilson et al.
2022/0399841 A1* 12/2022 Dai ..................... H02P 21/0003

* cited by examiner

US 12,034,306 B1

HYBRID TURBINE AND MULTIPLE-SPOOL ELECTRIC POWER SYSTEM FOR AIRCRAFT

FIELD

The disclosed examples relate to a hybrid power system for an aircraft.

BACKGROUND

Aircraft having a hybrid power system can utilize both aviation fuel and electric power to generate propulsion, and the hybrid power system can otherwise enable generation and advantageous use of electric power. Such hybrid power systems can help to reduce consumption of aviation fuel and reduce carbon emissions compared to a fuel-based power system.

SUMMARY

One example provides a hybrid power system for an aircraft. The hybrid power system comprises a high-voltage DC (HVDC) bus and a generator-motor system configured to (1) selectively receive electric power from the HVDC bus to assist an engine of the aircraft in providing propulsion, and (2) provide electric power to the HVDC bus during regulated power extraction from the engine. The generator-motor system includes a low-pressure spool (LPS) generator/motor, a high-pressure spool (HPS) generator/motor, and a first AC/DC converter connected to the LPS generator/motor and the HVDC bus. The LPS generator/motor is coupled with an LPS shaft of the engine. The HPS generator/motor is coupled with an HPS shaft of the engine. The generator-motor system further has a second AC/DC converter connected to the HPS generator/motor, the first AC/DC converter, and the HVDC bus. The hybrid power system further comprises, in some examples, an electric motor connected to the HVDC bus and configured to provide propulsion and electric power. The hybrid power system further comprises an AC and DC distribution systems connected to the HVDC bus. A control system is configured to selectively control a state of a connection to the HVDC bus of one or more of the first AC/DC converter, the second AC/DC converter, the electric motor, the AC distribution system, and the DC distribution system.

DETAILED DESCRIPTION

Some aircraft employ hybrid power systems in which some type of generator mechanism is connected to the engine to generate electric power. However, such hybrid power systems may have various drawbacks. Typically, these systems are limited in the way that the generator connects to and interacts with jet engine(s) of the aircraft. For example, in high bypass ratio engines, the electric component is typically extracted from only the high-pressure spool (HPS) shaft of the engine, and electric motoring power to assist the engine is not provided/available.

Accordingly, examples are disclosed that relate to a hybrid power system having a hybrid turbine and multiple-spool electric power generation for an aircraft. Briefly, the hybrid power system comprises a generator-motor system connected to a high-voltage direct current (HVDC) bus. The generator-motor system is configured to provide propulsion and/or electric power for other uses. The generator-motor system has a low-pressure spool (LPS) generator/motor and an HPS generator/motor operatively coupled to the aircraft engine to provide electric engine assist and/or provide electric power to the HVDC bus. In some examples, the hybrid power system further comprises an electric motor connected to the HVDC bus. The electric motor is configured to provide propulsion and/or electric power. An AC distribution system and a DC distribution system are further connected to the HVDC bus. In typical examples, the DC distribution system has a high-voltage (HV) battery. The HV battery can provide electric power to the HVDC bus.

A control system is configured to selectively control connections of various components to the HVDC bus. Changing the connections to the HVDC bus enables control of distribution, production, consumption, and storage of electric power on the aircraft. Further, selective control of the LPS and HPS generator/motors can improve engine stability margins and/or increase fuel efficiency of the aircraft engine. More specifically, such configurations may improve a thrust-specific fuel consumption (TSFC) of the hybrid power system, and thus can increase an efficiency of power-generation and/or propulsion of the aircraft over one or more operation phases. Further, the disclosed hybrid power system may help to reduce/optimize accessory equipment power extraction off the engine and/or reduce a size of the engine.

Figure 1:
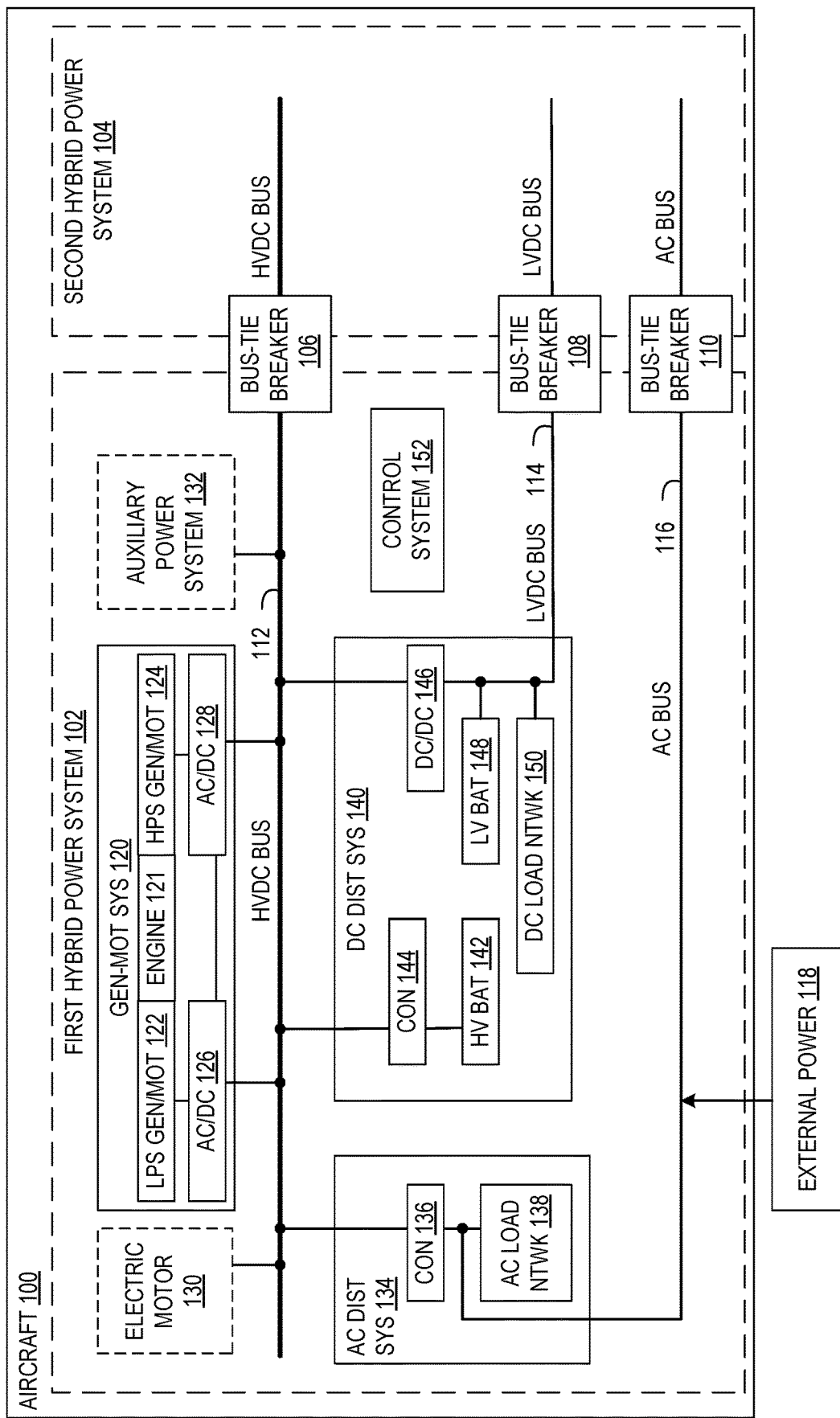
FIG. 1 shows a block diagram of an example hybrid power system on an aircraft.

FIG. 1 depicts a block diagram of components of an aircraft 100 having an example hybrid power system using a dual-spool configuration for electric power generation and electric engine assist. A specific form factor of aircraft 100 is not depicted, though it will be appreciated that the hybrid power system examples herein are applicable to any suitable type of aircraft, including commercial passenger aircraft, military aircraft, cargo aircraft, unmanned aircraft, or other suitable aircraft having multiple-spool engines. Aircraft 100 includes a first hybrid power system 102 and a second hybrid power system 104. First hybrid power system 102 and second hybrid power system 104 can include similar components. For clarity, the components of second hybrid power system 104 have been omitted from FIG. 1. In some examples, first hybrid power system 102 can provide electric power to a first portion of aircraft 100, and second hybrid power system 104 can provide electric power to a second portion of aircraft 100—e.g., right and left sides. In other examples, one system can be a primary power system with the other providing a redundancy/backup power system. The depicted example further includes bus-tie breakers 106, 108, and 110 to provide selectively controllable connections between first hybrid power system 102 and second hybrid power system 104. In further examples, aircraft 100 may have more than two hybrid power systems.

Hybrid power system 102 has an HVDC bus 112. In some examples, HVDC bus 112 can include a 3-wire HVDC bus having a positive bus, a neutral bus, and a negative bus. The 3-wire HVDC bus may be desirable in some implementations to reduce voltage differences between the three buses. As indicated, a low-voltage direct current (LVDC) bus 114 may also be included, for example, to support appropriate DC voltage levels.

Hybrid power system 102 further has an alternating current (AC) bus 116. AC bus 116 can have a 3-phase configuration in some examples. As shown, AC bus 116 is configured to connect to external power 118, such as an electric power grid at a ground support facility, for example. In other examples, HVDC bus 112 is configured to connect to an external DC power source.

Hybrid power system 102 further has a generator-motor system 120 having an LPS generator/motor 122 operatively coupled to an engine 121. More specifically, LPS generator/motor 122 is configured to extract electric power from an LPS shaft of engine 121. Further, LPS generator/motor 122 can drive the LPS shaft of engine 121 in a motoring mode using electric power from HVDC bus 112. Similarly, an HPS generator/motor 124 is operatively coupled to an HPS shaft of engine 121 and can selectively extract electric power from the HPS shaft and/or drive/motor the HPS shaft with power drawn from HVDC bus 112.

Engine 121 can be a turbofan engine, high bypass ratio engine, or any other jet engine employing multiple spools. Engine 121 can provide propulsion, or thrust, to aircraft 100. More specifically, engine 121 provides propulsion by utilizing a fan directly driven by the LPS shaft and combustor exhaust ejected from a nozzle of engine 121. LPS generator/motor 122 and HPS generator/motor 124 are configured to simultaneously or separately provide spool-extracted electric power to HVDC bus 112. Generator-motor system 120 is typically also configured to transfer electric power between HPS generator/motor 124 and LPS generator/motor 122. In such a manner, electric power extracted from the LPS shaft of engine 121 can provide electric engine assist via the HPS shaft and vice versa. The electric engine assist may be used in low-speed engine conditions, such as on the ground, idle speeds, taxi, and during descent operation phases, for example. Such dual-shaft usage can increase engine stability margins and/or increase fuel efficiency of engine 121. As a specific example, generator-motor system 120 can be selectively controlled to a desired power level and/or to a desired extraction of electric power. Although the present examples include an engine with two spool shafts, it will be appreciated that three or more spool shafts could be employed. Accordingly, one of the generator/motors of the present discussion would be associated with a higher pressure spool shaft, another would be associated with a lower pressure spool shaft, and there would be other spool shafts on the engine which may or may not be associated with generator/motor accessories.

Appropriate converters can be provided in connection with generator-motor system 120. In the present example, a first AC/DC converter 126 is connected to LPS generator/motor 122 and HVDC bus 112. Similarly, a second AC/DC converter 128 is connected to HPS generator/motor 124, first AC/DC converter 126, and HVDC bus 112.

Hybrid power system 102 has an optional electric motor 130 connected to HVDC bus 112. Electric motor 130 is configured to selectively provide one or more of propulsion and electric power. More specifically, in some operating modes, electric motor 130 receives electric power from HVDC bus 112 and provides propulsion for aircraft 100. In other operating modes, electric motor 130 can operate in a generating mode to provide electric power to HVDC bus 112. In such a manner, electric motor 130 can help to provide propulsion and/or electric power to aircraft 100, and thereby reduce fuel consumption and/or carbon emission of the aircraft.

Hybrid power system 102 includes an optional auxiliary power system 132. Auxiliary power system 132 is a non-propulsive power source and a converter. Non-propulsive power source can include a turbine or a DC power source as discussed below with reference to FIGS. 13 and 14. Auxiliary power system 132 can help supply additional electric power, as needed, to other components through HVDC bus 112.

Hybrid power system 102 further has an AC distribution system 134 connected to HVDC bus 112. AC distribution system 134 includes a converter 136 and an AC load network 138 that services various AC loads. Examples of AC loads include compressor systems, air conditioning systems, pump systems, hydraulic systems, and fan systems. Example loads will be discussed further below with reference to FIGS. 6, 7, and 8. Further, electric power can be transferred to HVDC bus 112 from AC bus 116 using converter 136 when AC bus 116 is connected to external power 118.

Hybrid power system 102 also has a DC distribution system 140 connected to HVDC bus 112. In the current example, DC distribution system 140 has an HV battery 142 connected to HVDC bus 112 via converter 144. In various examples, HV battery 142 can stabilize a voltage on HVDC bus 112 or provide additional electric power for electric engine assist. Examples of HV battery 142 include lithium-ion batteries, nickel-metal hydride batteries, lead acid batteries, or any other suitable type of battery.

DC distribution system 140 further has a DC/DC converter 146 configured to implement voltage conversion between HVDC bus 112 and LVDC bus 114. An LV battery 148 can be connected to LVDC bus 114 to provide electric power to LVDC bus 114. A DC load network 150 is connected to LVDC bus 114 for servicing various DC loads, such as avionics, power controllers, and instrument buses, for example.

Hybrid power system 102 further has a control system 152. Control system 152 is configured to selectively control a state of a connection to HVDC bus 112 of one or more of first AC/DC converter 126, second AC/DC converter 128, electric motor 130, AC distribution system 134, DC distribution system 140, and auxiliary power system 132. The state of the connection to HVDC bus 112 can be controlled based on propulsion demands, electrical load demands, and/or any other suitable criteria, mode, etc., relating to hybrid power system 102. Further, the state of each connection can be changed by utilizing contactors, circuit breakers, or other suitable switchgear hardware (not shown in FIG. 1 for clarity). Examples of the state of the connection include an open state and a closed state. In such a manner, control system 152 can selectively control which systems are generating and providing electric power to HVDC bus 112. In various examples, one of electric motor 130, LPS generator/motor 122, HPS generator/motor 124, auxiliary power system 132, HV battery 142, or LV battery 148 can generate the electric power or any suitable combination thereof. Control system 152 is further configured to selectively control a state of bus-tie breakers 106, 108, and 110.

Control system 152 can be configured to direct electric power toward LPS generator/motor 122 and/or HPS generator/motor 124 for propulsive assistance, such as engine starting, turbine motoring, and electric engine assist, for example. Control system 152 can further be configured to change a mode of operation for various power converters in hybrid power system 102, such as converter 136, converter 144, DC/DC converter 146, first AC/DC converter 126, and second AC/DC converter 128. Control system 152 can be configured to perform electrical load balancing for one or more of electric motor 130, LPS generator/motor 122, HPS generator/motor 124, auxiliary power system 132, HV battery 142, or LV battery 148. In other examples, control system 152 can further be configured to control other functions of hybrid power system 102. While FIG. 1 depicts a single control system, it will be appreciated that control system 152 can be divided into different control systems, integrated into one or more systems of hybrid power system 102, and/or part of a control system located in a different system of aircraft 100.

An aircraft may have different propulsion demands and/or electric power demands during different operating modes of the aircraft. The operating modes may reflect various operation phases of the aircraft, such as ground operations, ascent, cruise, and descent, for example. As previously mentioned, hybrid power system 102 can be selectively controlled and operated to optimize production, consumption, distribution, and storage of electric power for an aircraft. FIGS. 2, 3, 4, and 5 schematically depict exemplary uses of hybrid power system 102.

Figure 2:
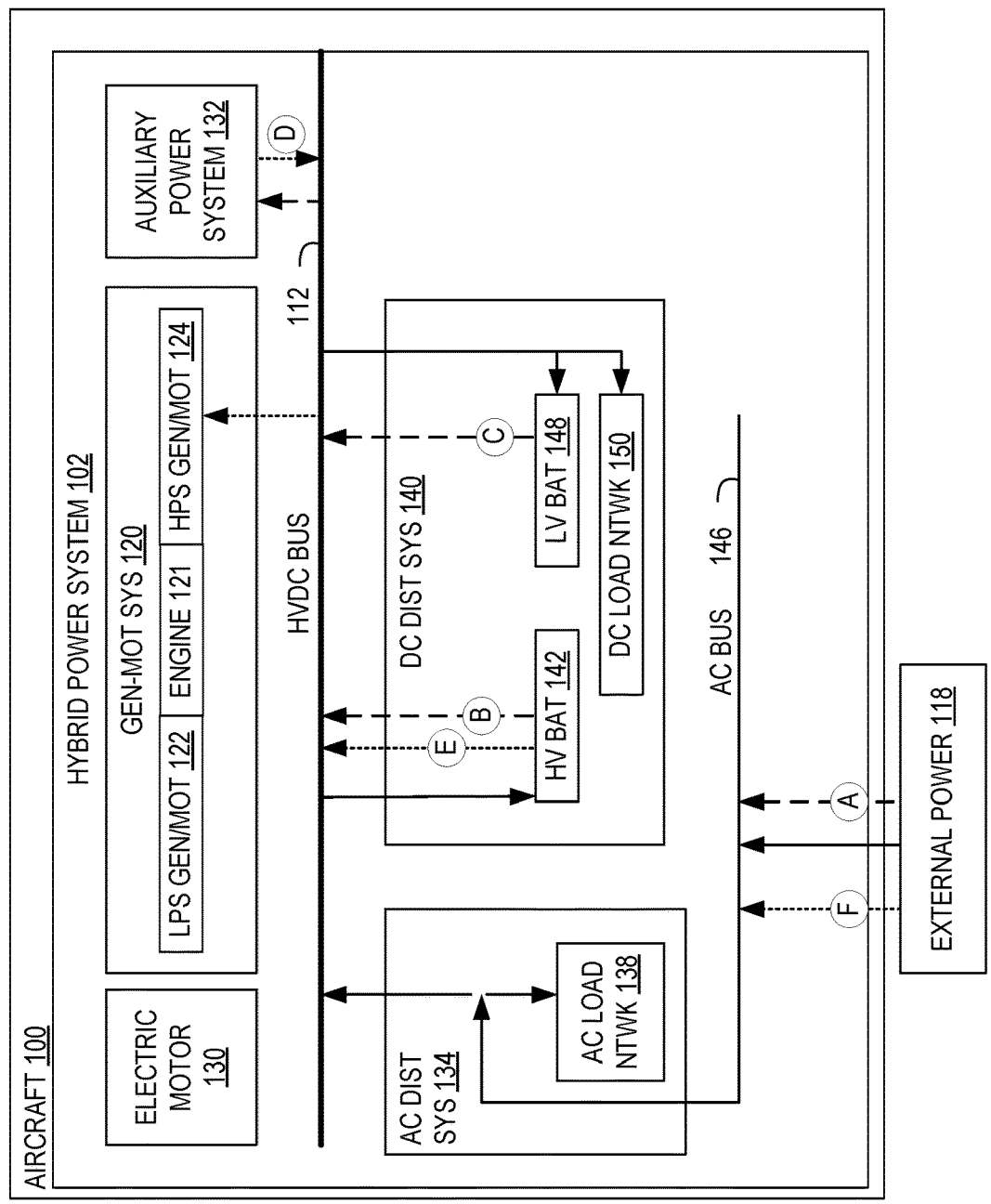
FIG. 2 schematically shows an example flow of electric power for the hybrid power system of FIG. 1 during ground operation and generator/engine starts.

FIG. 2 schematically depicts an example flow of the electric power of hybrid power system 102 of aircraft 100 during various non-flight operating modes on the ground. During a first operating mode 200 (e.g., battery charging), aircraft 100 is connected to external power 118. The electric power flows to AC bus 146, AC load network 138, and HVDC bus 112. From HVDC bus 112, the electric power flows to DC load network 150, LV battery 148, and HV battery 142. HV battery 142 and/or LV battery 148 can be charged during first operating mode 200. In addition to battery charging, examples of first operating mode 200 include boarding, deboarding, regular maintenance, functionality checks, and/or safety checks. In other examples, one or more of AC load network 138 or DC load network 150 may not receive electric power during first operating mode 200.

During an optional second operating mode 202, auxiliary power system 132 receives the electric power from HVDC bus 112 to start a turbine in examples where auxiliary power system 132 includes a turbine. In second operating mode 202, AC bus 146 and HVDC bus 112 can receive the electric power from external power 118, as indicated by A. Alternatively or additionally, HVDC bus 112 can receive the electric power from HV battery 142, as indicated by B, and/or LV battery 148, as indicated by C. Similar to first operating mode 200, one or more of AC load network 138, DC load network 150, HV battery 142, or LV battery 148 can receive the electric power from external power 118 during second operating mode 202.

During a third operating mode 204, HPS generator/motor 124 receives the electric power from HVDC bus 112 to start engine 121. In various examples, HVDC bus 112 can receive the electric power from auxiliary power system 132, as indicated by D, HV battery 142, as indicated by E, and/or external power 118, via AC bus 146 and as indicated by F. Regarding modes 200, 202, and 204, it will be appreciated that the described power flows are non-limiting examples and that the depicted hybrid power system can support other flows as needed during non-flight operations.

Figure 3:
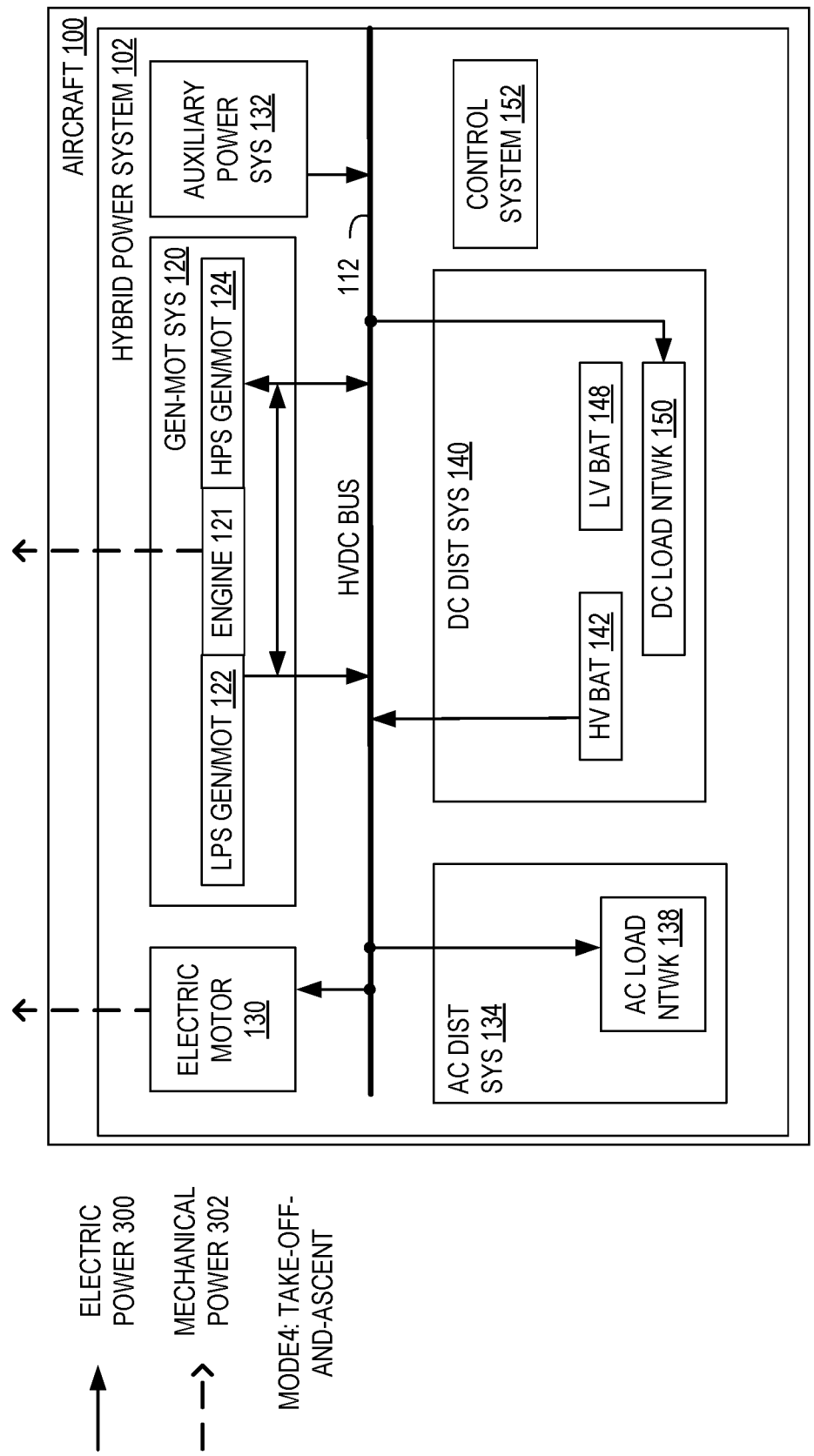
FIG. 3 schematically shows an example flow of electric power for the hybrid power system of FIG. 1 during a take-off-and-climb operation phase.

Next, FIG. 3 schematically depicts an example flow of electric power 300 of hybrid power system 102 during a fourth operating mode. The fourth operating mode may generally represent a take-off-and-ascent operation phase of aircraft 100. As such, electric motor 130 and engine 121 can produce mechanical power 302 to provide propulsion for aircraft 100. Electric motor 130 receives electric power 300 from HVDC bus 112. As shown, LPS generator/motor 122 provides electric power 300 to HVDC bus 112 (e.g., in a generating mode powered by the respective spool shaft). HPS generator/motor 124 is configured to alternately provide electric power 300 to HVDC bus 112, during regulated power extraction from engine 121, (generating via spool extraction) and receive electric power 300 from HVDC bus 112. Electric power 300 received from HVDC bus 112 can be used to provide an electric engine assist to the HPS shaft of engine 121.

Alternatively or additionally, generator-motor system 120 is selectively controllable to transfer electric power 300 between LPS generator/motor 122 and HPS generator/motor 124. In such a manner, electric power 300 extracted using LPS generator/motor 122 can provide an electric engine assist through HPS generator/motor 124 to engine 121. Alternatively, electric power 300 extracted using HPS generator/motor 124 can provide an electric engine assist through LPS generator/motor 122 to engine 121. The electric engine assist can help to improve engine stability margins and may help to reduce a size of engine 121. Control system 152 selectively controls the configuration of generator-motor system 120 and HPS generator/motor 124 (e.g., generating v. motoring). Control system 152 can change the configuration of generator-motor system 120 and HPS generator/motor 124 based on engine performance demands and power demands of aircraft 100, or in any other suitable manner. More specifically, the engine performance demands and power demands can include information relating to operation phase, engine operation, and/or a priority of electrical loads, for example. In such a manner, a control of generator-motor system 120 can be adjusted to a desired and optimized performance.

As depicted, HV battery 142 and auxiliary power system 132 can provide electric power 300 to HVDC bus 112. LV battery 148 is configured in a standby mode in the present example, though it can be employed as needed. Further, AC load network 138 and DC load network 150 receive electric power 300 from HVDC bus 112. In some examples, control system 152 can be further configured to perform load shedding in one or more of AC load network 138 or DC load network 150 based on a load priority. Such a configuration can help to generate more mechanical power for propulsion. Regarding the fourth operating mode, it will be appreciated that the described power flows are non-limiting examples and that the depicted hybrid power system can support other flows as needed during the take-off-and-ascent operation phase.

Figure 4:
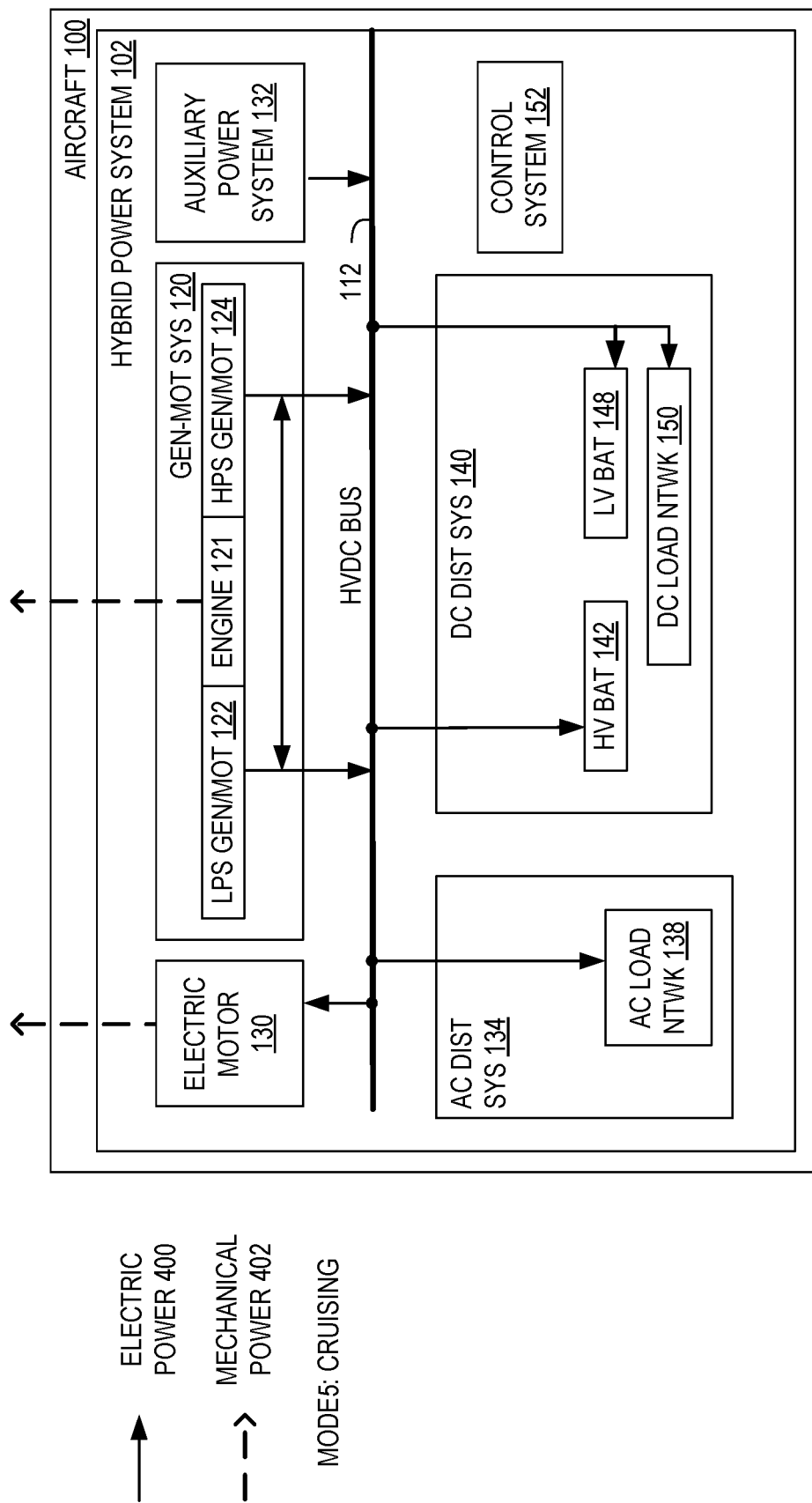
FIG. 4 schematically shows an example flow of electric power for the hybrid power system of FIG. 1 during a cruise operation phase.

Next, FIG. 4 schematically depicts an example flow of electric power 400 of hybrid power system 102 during a fifth operating mode. The fifth operating mode can generally represent a cruising operation phase of aircraft 100. As such, electric motor 130 and engine 121 produce mechanical power 402 to provide propulsion for aircraft 100. Electric motor 130 receives electric power 400 from HVDC bus 112. As shown, LPS generator/motor 122 and HPS generator/motor 124 provide electric power 400 to HVDC bus 112 via spool extraction. Further, electric power 400 can be transferred between LPS generator/motor 122 and HPS generator/motor 124. In such a manner, electric power 400 extracted using LPS generator/motor 122 can provide an electric engine assist through HPS generator/motor 124 to engine 121. Alternatively, electric power 400 extracted using HPS generator/motor 124 can provide an electric engine assist through LPS generator/motor 122 to engine 121. The electric engine assist can help lower fuel consumption of engine 121 or provide additional propulsion, such as during periods of increased wind speed, for example. Control system 152 selectively controls transfer of electric power 400 between LPS generator/motor 122 and HPS generator/motor 124. Such a configuration can help to increase an efficiency of engine 121 during the fifth operating mode of aircraft 100.

In the example of FIG. 4, auxiliary power system 132 provides electric power 400 to HVDC bus 112. HV battery 142 and LV battery 148 are charged from HVDC bus 112. Alternatively, LV battery 148 can be in a stand-by mode. Further, AC load network 138 and DC load network 150 can receive electric power 400 from HVDC bus 112. Regarding the fifth operating mode, it will be appreciated that the described power flows are non-limiting examples and that the depicted hybrid power system can support other flows as needed during the cruising operation phase.

Figure 5:
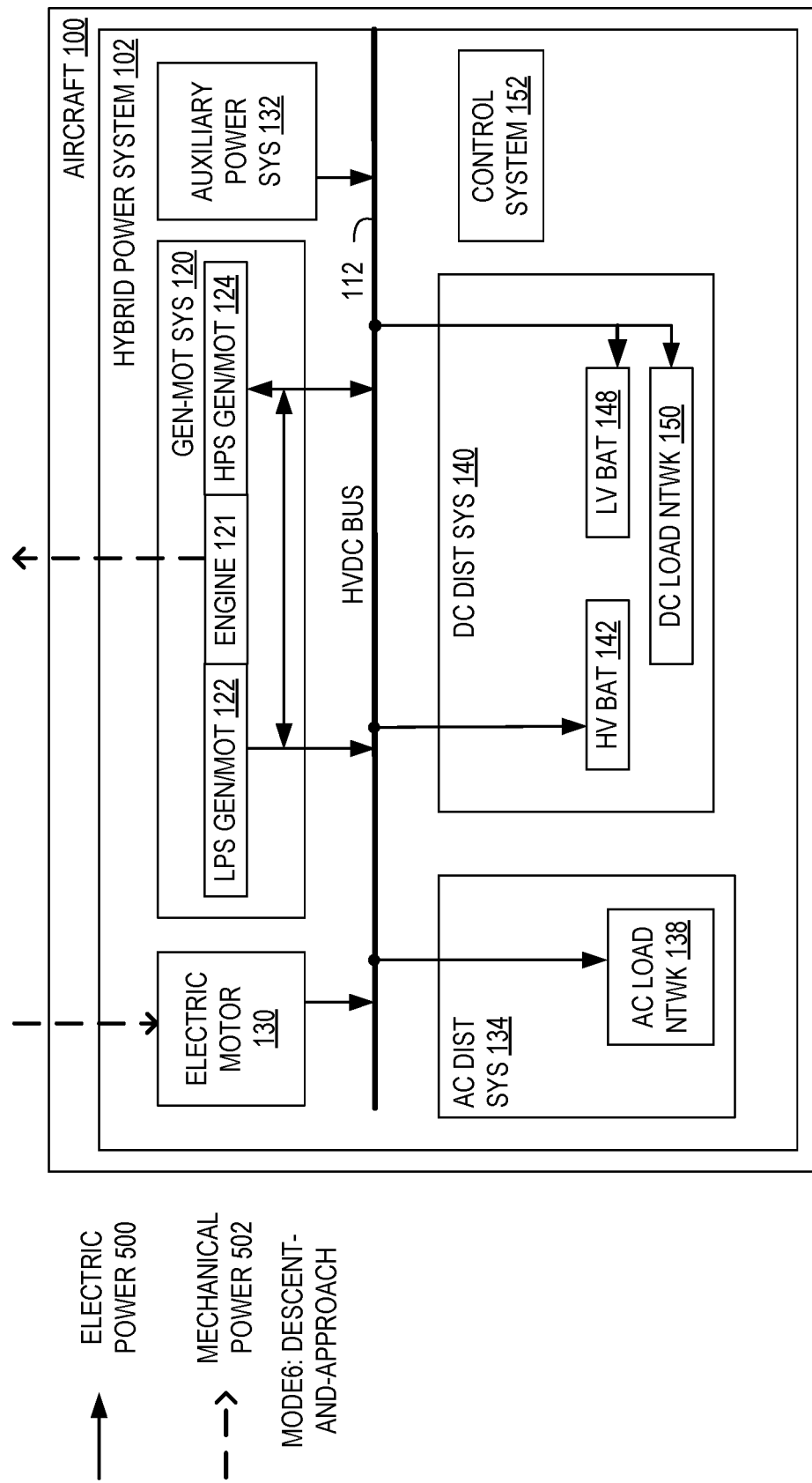
FIG. 5 schematically shows an example flow of electric power for the hybrid power system of FIG. 1 during a descent-and-approach operation phase.

Next, FIG. 5 schematically depicts an example flow of electric power 500 of hybrid power system 102 during a sixth operating mode. The sixth operating mode may generally represent a descent-and-approach operation phase of aircraft 100. During the sixth operating mode, engine 121 produces mechanical power 502 to provide propulsion for aircraft 100. As shown, LPS generator/motor 122 provides electric power 500 to HVDC bus 112. Further, HPS generator/motor 124 can alternately provide electric power 500, during regulated power extraction from engine 121, to HVDC bus 112 and receive electric power 500 from HVDC bus 112. Electric power 500 received from HVDC bus 112 can be used to provide an electric engine assist to the HPS shaft of engine 121. Alternatively or additionally, electric power 500 can be transferred between LPS generator/motor 122 and HPS generator/motor 124. In such a manner, electric power 500 extracted using LPS generator/motor 122 can provide an electric engine assist through HPS generator/motor 124 to engine 121. Alternatively, electric power 500 extracted using HPS generator/motor 124 can provide an electric engine assist through LPS generator/motor 122 to engine 121. The electric engine assist can help to lower a fuel consumption of engine 121, improve engine stability margins, or to provide additional propulsion. Control system 152 selectively controls the flow of electric power 500 to and from HPS generator/motor 124. Such a configuration can help to increase an efficiency of engine 121 during the sixth operating mode of aircraft 100.

In contrast to the fourth and fifth operating modes, electric motor 130 receives mechanical power 502 during the sixth operating mode. More specifically, electric motor 130, in regenerative operation, provides electric power 500 to HVDC bus 112 during the sixth operating mode by acting as a generator driven by one or more propellers. In such a manner, electric power 500 can be collected and stored in HV battery 142 and/or LV battery 148 during the sixth operating mode. As shown, auxiliary power system 132 provides electric power 500 to HVDC bus 112.

As indicated, HV battery 142 and LV battery 148 are charged from HVDC bus 112 during the sixth operating mode. Further, AC load network 138 and DC load network 150 receive electric power 500 from HVDC bus 112. In other examples, AC load network 138 can have one or more actuation motors located on flight control surfaces of aircraft 100. The actuation motors can generate and deliver electric power to HVDC bus 112. Regarding the sixth operating mode, it will be appreciated that the described power flows are non-limiting examples and that the depicted hybrid power system can support other flows as needed during the descent-and-approach operation phase. FIGS. 2, 3, 4, and 5 are illustrative, and other suitable flows of electric power can be used during any suitable operating mode.

Figure 6:
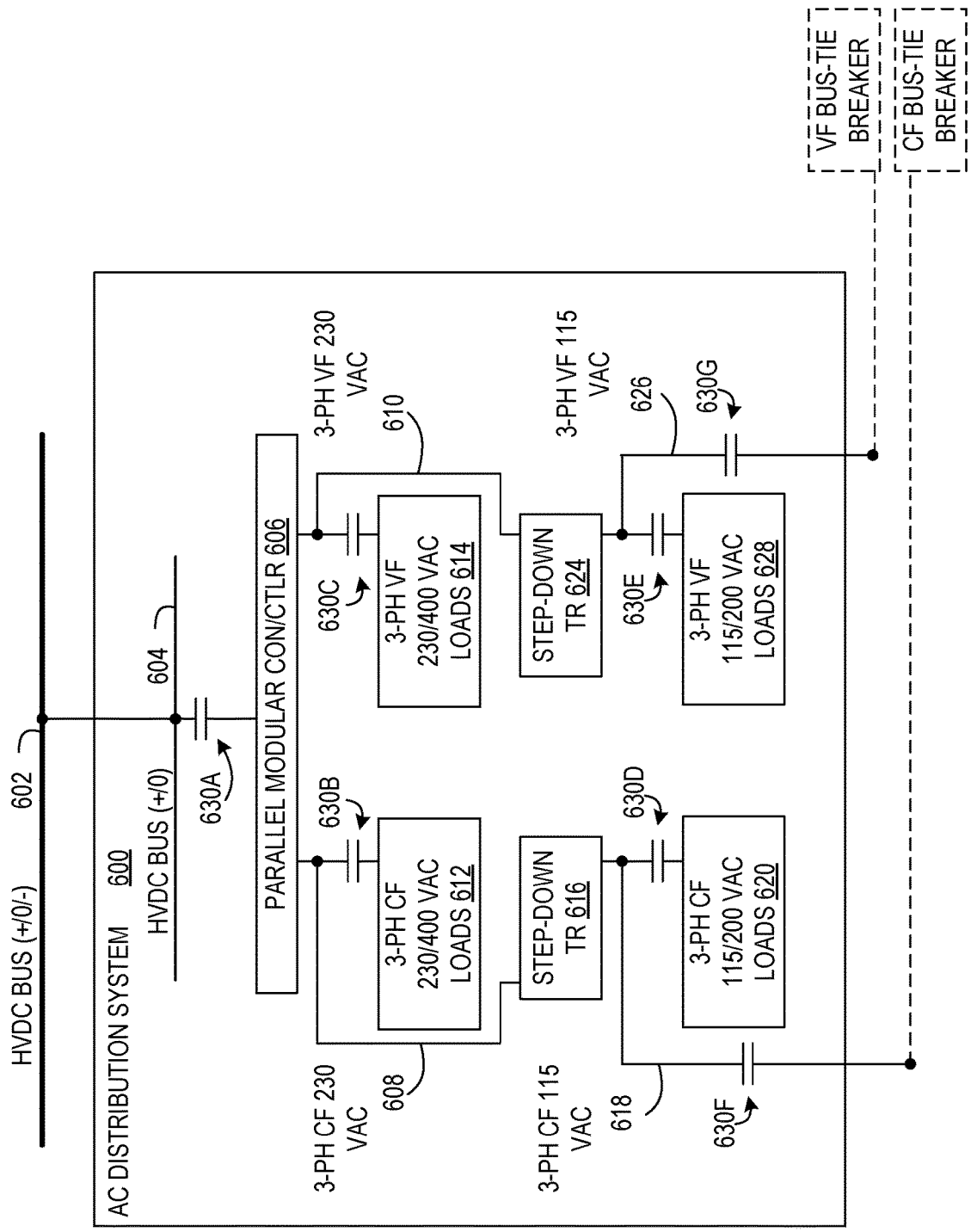
FIG. 6 shows a block diagram of an example AC distribution system having step-down transformers.
Figure 7:
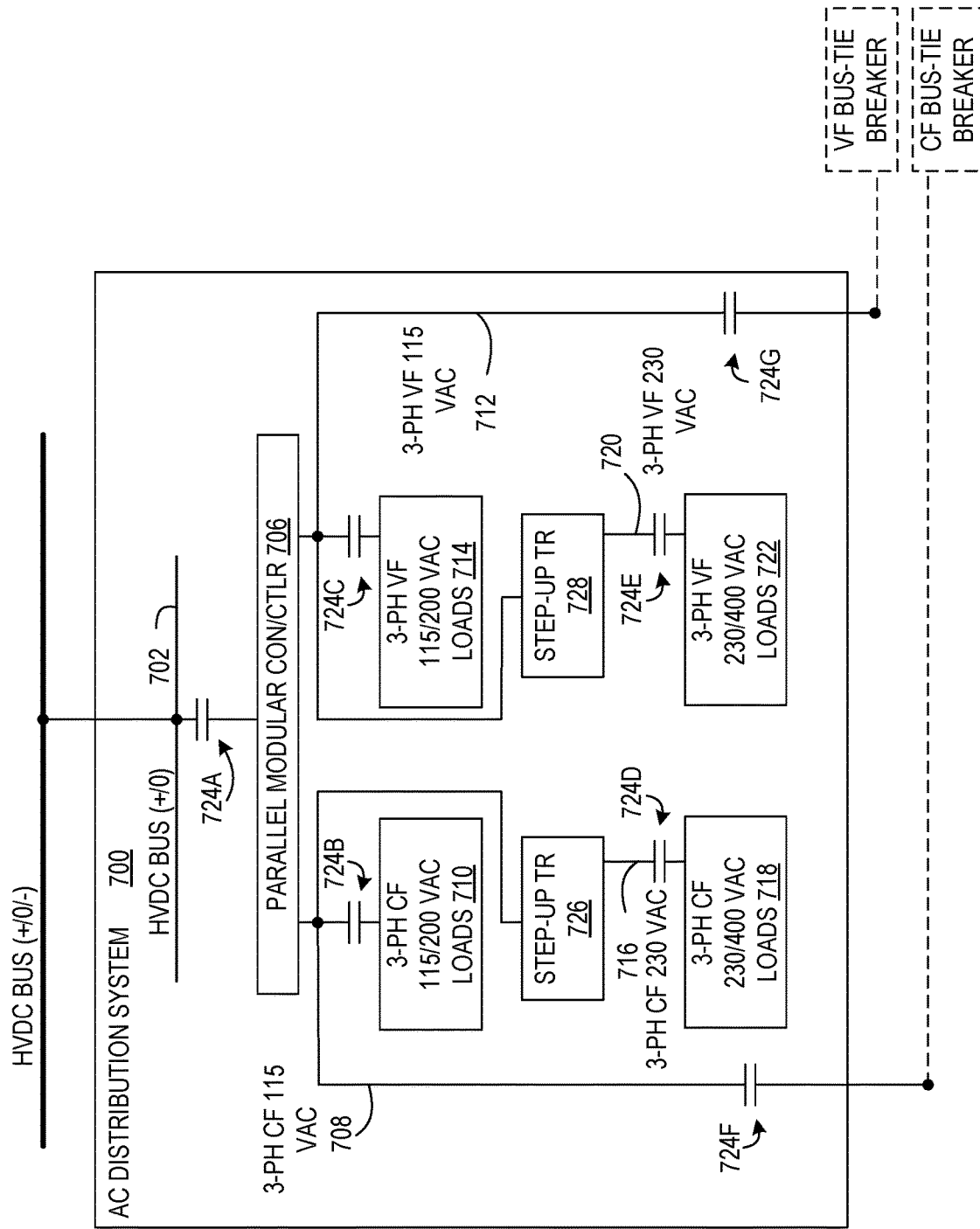
FIG. 7 shows a block diagram of an example AC distribution system having step-up transformers.
Figure 8:
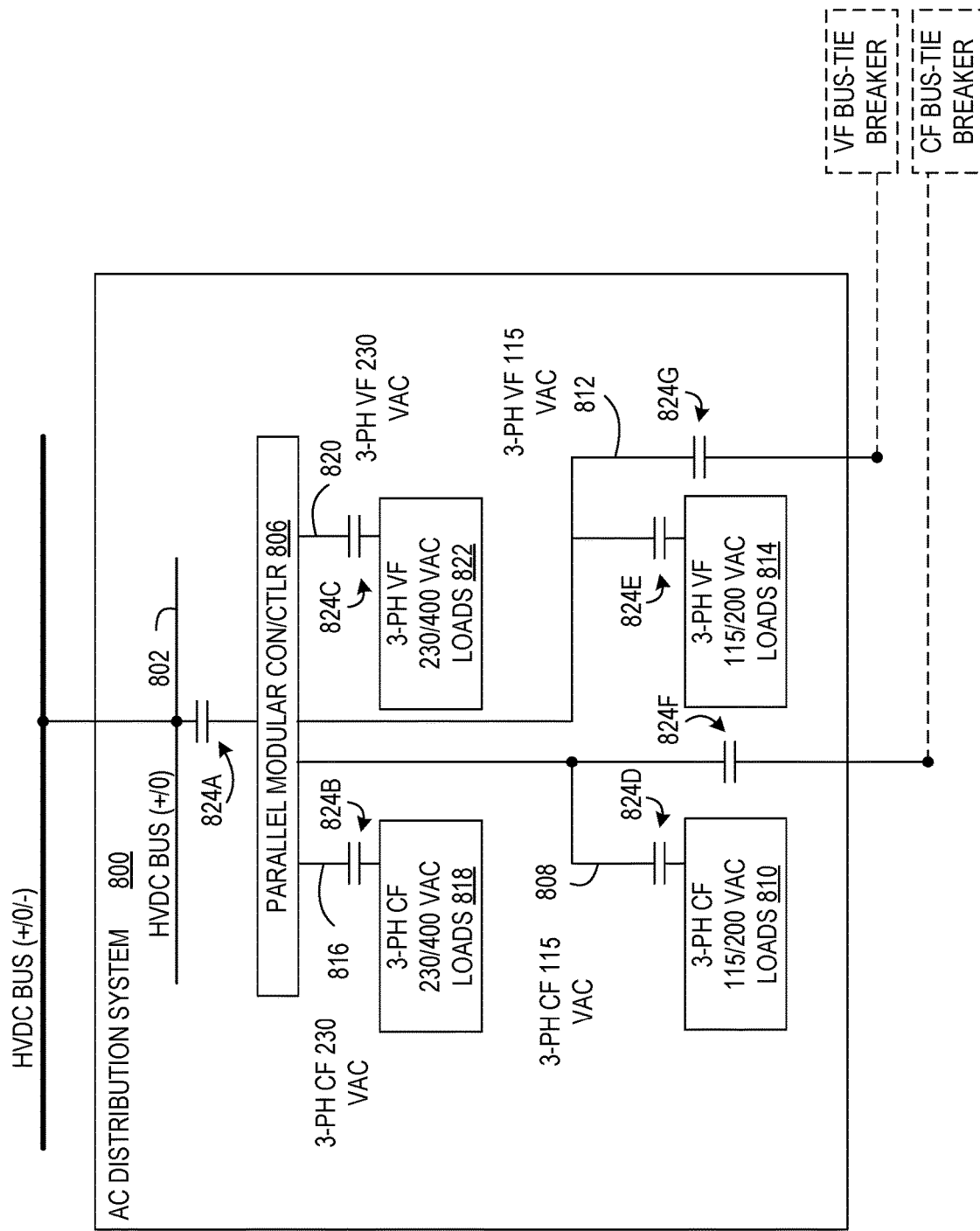
FIG. 8 shows a block diagram of an example AC distribution system without transformers.

A hybrid power system for an aircraft may have different AC load networks having different voltages and/or frequencies. As such, an AC distribution system of the hybrid power system may have more than one AC bus. FIGS. 6, 7, and 8 depict various configurations of an AC distribution system having a plurality of AC buses and AC load networks.

FIG. 6 depicts a block diagram of an example AC distribution system 600 having step-down transformers. AC distribution system 600 is an example of AC distribution system 134. AC distribution system 600 is connected to a 3-wire HVDC bus 602 having a positive bus, a neutral bus, and a negative bus. AC distribution system 600 includes a 2-wire HVDC bus 604 formed using the neutral bus and the positive bus. A voltage difference between positive bus and neutral bus can be less than a voltage difference between positive bus and negative bus. In such a manner, 2-wire HVDC bus 604 can reduce complexity and/or size of electrical power components in AC distribution system 600. In other examples, 2-wire HVDC bus 604 can be formed using the neutral bus and the negative bus.

AC distribution system 600 further includes a parallel modular converter/controller 606 connected to 2-wire HVDC bus 604. Parallel modular converter/controller 606 is configured to convert 2-wire HVDC bus to (1) a 3-phase constant frequency (CF) 230 VAC (volt AC) bus 608; and (2) a 3-phase variable frequency (VF) 230 VAC bus 610. 3-phase CF 230 VAC bus 608 provides electric power to 3-phase CF 230/400 VAC loads 612. Similarly, 3-phase VF 230 VAC bus 610 provides electric power to 3-phase VF 230/400 VAC loads 614.

A first step-down transformer 616 is configured to convert 3-phase CF 230 VAC bus 608 to a 3-phase CF 115 VAC bus

618. 3-phase CF 115 VAC bus 618 provides electric power to 3-phase CF 115/200 VAC loads 620. Similarly, a second step-down transformer 624 is configured to convert 3-phase VF 230 VAC bus 610 to a 3-phase VF 115 VAC bus 626. 3-phase VF 115 VAC bus 626 provides electric power to 3-phase VF 115/200 VAC loads 628. A plurality of switchgear hardware 630 are selectively controllable to change a state of a corresponding connection to the HVDC bus.

Next, FIG. 7 depicts a block diagram of an example AC distribution system 700 having step-up transformers. AC distribution system 700 is an example of AC distribution system 134. AC distribution system 700 includes (1) a 2-wire HVDC bus 702; (2) a parallel modular converter/controller 706; (3) a 3-phase CF 115 VAC bus 708; (4) 3-phase CF 115/200 VAC loads 710; (5) a 3-phase VF 115 VAC bus 712; (6) 3-phase VF 115/200 VAC loads 714; (7) a 3-phase CF 230 VAC bus 716; (8) 3-phase CF 230/400 VAC loads 718; (9) a 3-phase VF 230 VAC bus 720; (10) 3-phase VF 230/400 VAC loads 722, and (11) a plurality of switchgear hardware 724. In contrast to AC distribution system 600 (FIG. 6), parallel modular converter/controller 706 is configured to convert 2-wire HVDC bus 702 to 3-phase CF 115 VAC bus 708 and 3-phase VF 115 VAC bus 712. Therefore, AC distribution system 700 further includes a first step-up transformer 726 configured to generate a 3-phase CF 230 VAC bus 716 from 3-phase CF 115 VAC bus 708. Similarly, a second step-up transformer 728 is configured to generate a 3-phase VF 230 VAC bus 720 from 3-phase VF 115 VAC 712. AC distribution system 700 can be selected when a voltage on 2-wire HVDC bus 702 is within a range for a DC to AC inversion to 115 VAC. Such a configuration can reduce total harmonic distortion.

Next, FIG. 8 depicts a block diagram of an example AC distribution system 800 without transformers. AC distribution system 800 is an example of AC distribution system 134. Similar to AC distribution system 600, AC distribution system 800 includes (1) a 2-wire HVDC bus 802; (2) a parallel modular converter/controller 806; (3) a 3-phase CF 115 VAC bus 808; (4) 3-phase CF 115/200 VAC loads 810; (5) a 3-phase VF 115 VAC bus 812; (6) 3-phase VF 115/200 VAC loads 814; (7) a 3-phase CF 230 VAC bus 816; (8) 3-phase CF 230/400 VAC loads 818; (9) a 3-phase VF 230 VAC bus 820; (10) 3-phase VF 230/400 VAC loads 822; and (11) a plurality of switchgear hardware 824. In contrast to the previously-described AC distribution systems, parallel modular converter/controller 806 is configured to convert 2-wire HVDC bus 702 to multiple buses as follows: (1) 3-phase CF 115 VAC bus 808; (2) 3-phase VF 115 VAC bus 812; (3) 3-phase CF 230 VAC bus 816; and (4) 3-phase VF 230 VAC bus 820. AC distribution system 800 can be selected when a voltage on 2-wire HVDC bus 702 is within a range for a DC to AC inversion to 230 VAC. Such a configuration can reduce total harmonic distortion. FIGS. 6, 7, and 8 are illustrative, and other implementations of AC distribution system 134 can have other components and/or use other suitable configurations in other examples.

Figure 9:
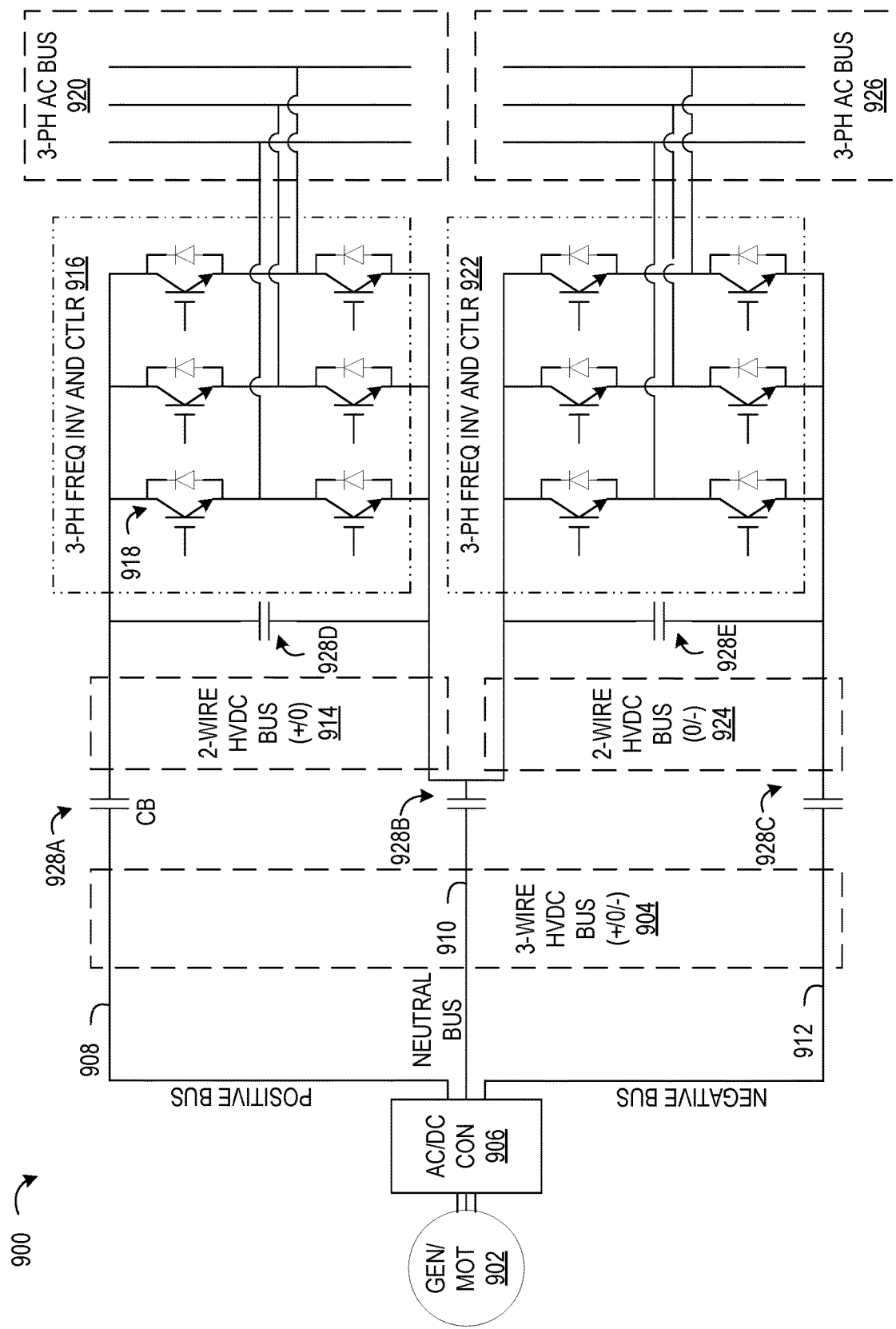
FIG. 9 schematically shows an example bus configuration for generating 3-phase AC buses.

In the above examples, the AC distribution systems utilize a 3-wire HVDC bus and a 2-wire HVDC bus to generate various 3-phase AC buses. FIG. 9 shows an example bus configuration 900 in a hybrid power system for generating 3-phase AC buses. Bus configuration 900 can be used by hybrid power system 102, for example. A generator/motor 902 provides electric power to a 3-wire HVDC bus 904 using an AC/DC converter 906. In some examples, generator/motor provides electric power having 1000V to 3-wire HVDC bus 904. Generator/motor 902 can represent LP S generator/motor 122, HP S generator/motor 124, and/or other suitable generators or motors on an aircraft. As shown, 3-wire HVDC bus 904 has a positive bus 908, a neutral bus 910, and a negative bus 912.

Bus configuration 900 further includes a first 2-wire HVDC bus 914 having positive bus 908 and neutral bus 910. In the examples where 1000V is provided to 3-wire HVDC bus 904, first 2-wire HVDC bus 914 has a voltage of 500V. First 2-wire HVDC bus 914 is connected to a first 3-phase-frequency inverter and controller 916 having a plurality of switching stages 918. First 3-phase-frequency inverter and controller 916 is configured to convert first 2-wire HVDC bus 914 to a first 3-phase AC bus 920. Utilizing first 2-wire HVDC bus 914 to generate first 3-phase AC bus 920 can reduce equipment used in first 3-phase-frequency inverter and controller 916. First 3-phase-frequency inverter and controller 916 can have an array of parallel modular converter/controllers, in some examples. In other examples, first 3-phase-frequency inverter and controller 916 can have other configurations and/or other components not shown. In a similar manner, a second 3-phase-frequency inverter and controller 922 is configured to convert a second 2-wire HVDC bus 924 to a second 3-phase AC bus 926. As shown, second 2-wire bus has neutral bus 910 and negative bus 912. One or more of first 3-phase AC bus 920 or second 3-phase AC bus 926 can have a continuous frequency or a variable frequency. Bus configuration 900 further has a plurality of switchgear 928 configured to change connection states. FIG. 9 is illustrative, and other suitable bus configurations can be used.

Figure 10:
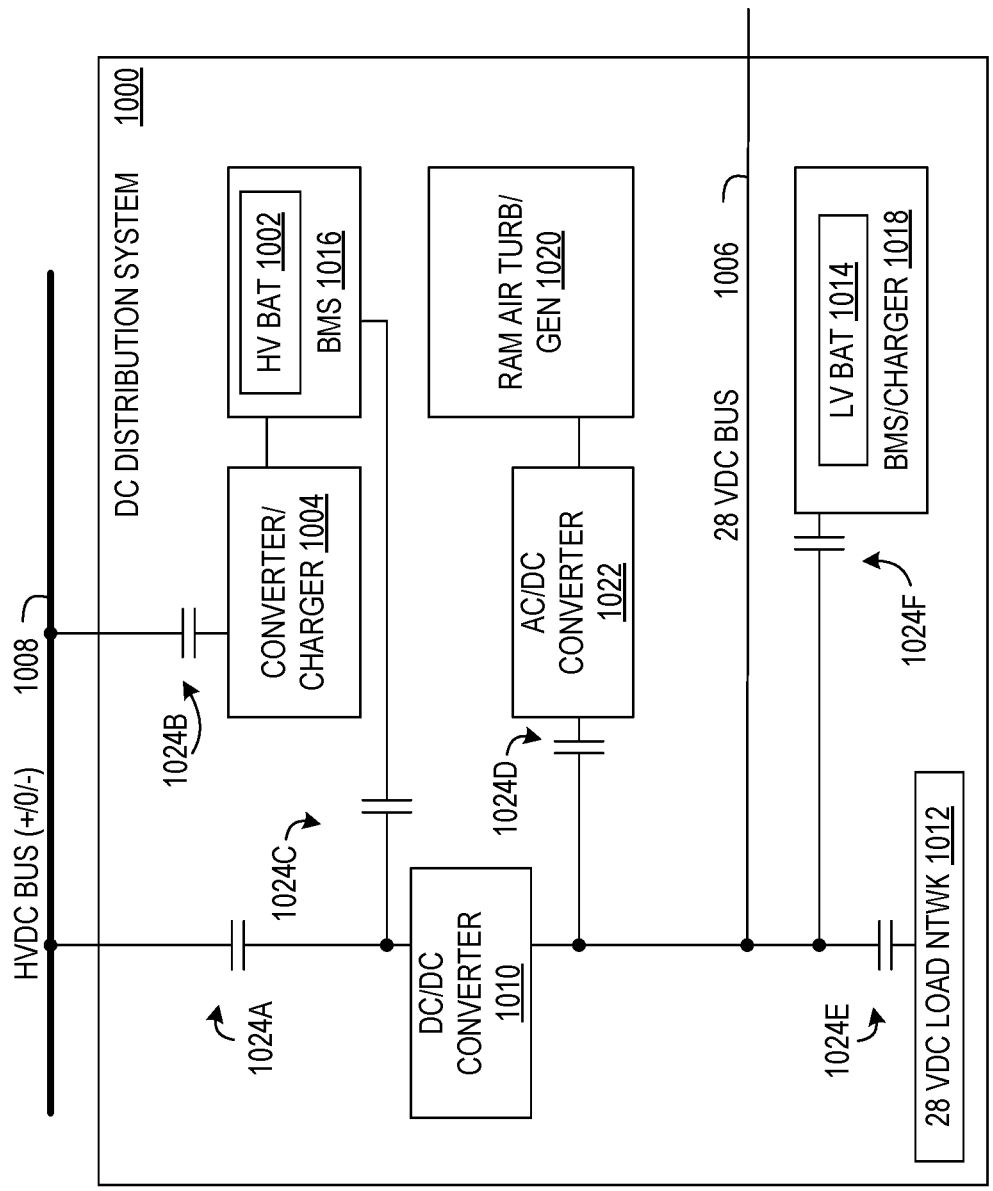
FIG. 10 shows a block diagram of an example DC distribution system.

DC distribution systems can have various DC electrical components. FIG. 10 depicts a block diagram of an example DC distribution system 1000. DC distribution system 1000 is an example of DC distribution system 140. Similar to DC distribution system 140, DC distribution system 1000 has an HV battery 1002 connected to a converter/charger 1004. Further, a 28 VDC (volt DC) bus 1006 is connected to a 3-wire HVDC bus 1008 using a DC/DC converter 1010. DC distribution system 1000 further has a 28 VDC load network 1012 and an LV battery 1014 connected to 28 VDC bus 1006.

In contrast, HV battery 1002 is implemented in a battery management system (BMS) 1016. BMS 1016 is configured to control HV battery 1002 during operation, such as during charging, for example. Similarly, LV battery 1014 is implemented in a BMS/charger 1018. As depicted, BMS 1016 is further connected to DC/DC converter 1010. In such a manner, HV battery 1002 can be used as an alternate power source for 28 VDC load network 1012.

DC distribution system 1000 further includes an optional ram air turbine/generator 1020 connected to 28 VDC bus 1006 using an AC/DC converter 1022. Ram air turbine/generator 1020 can have a wind turbine and an electric generator configured to provide a back-up source of electric power for a hybrid power system. A plurality of switchgear hardware 1024 are selectively controllable to change a state of a corresponding connection to the HVDC bus.

Figure 11:
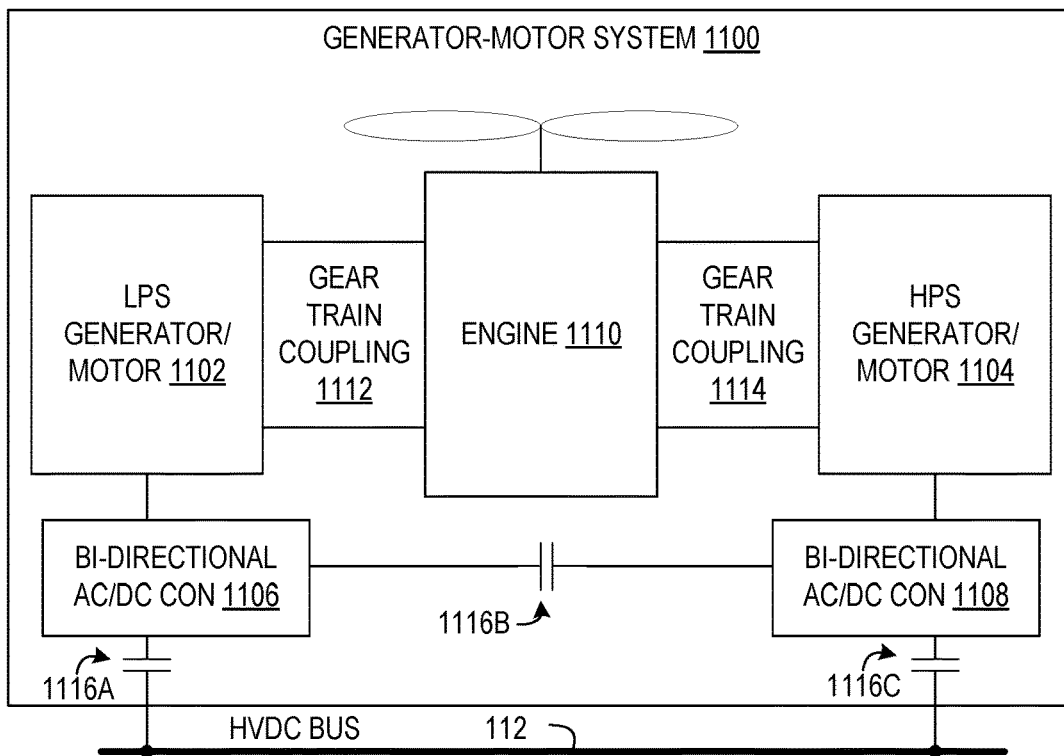
FIG. 11 shows a block diagram of an example generator-motor system.

As previously mentioned, a generator-motor system is configured to selectively provide mechanical power and/or electric power for an aircraft. FIG. 11 depicts a block diagram of an example generator-motor system 1100. Generator-motor system 1100 is an example implementation of generator-motor system 120. As such, generator-motor system 1100 is depicted as connected to HVDC bus 112. Similar to generator-motor system 120, generator-motor system 1100 has an LPS generator/motor 1102, an HPS generator/motor 1104, a first AC/DC converter 1106, a second AC/DC converter 1108, and an engine 1110. LPS generator/motor 1102 is coupled to engine 1110 using a first gear-train coupling 1112. Similarly, HPS generator/motor 1104 is coupled to engine 1110 using a second gear-train coupling 1114. A plurality of switchgear hardware 1116 are configured to change the relevant connection states. Such a configuration can help to increase an efficiency of generator-motor system 1100.

Figure 12:
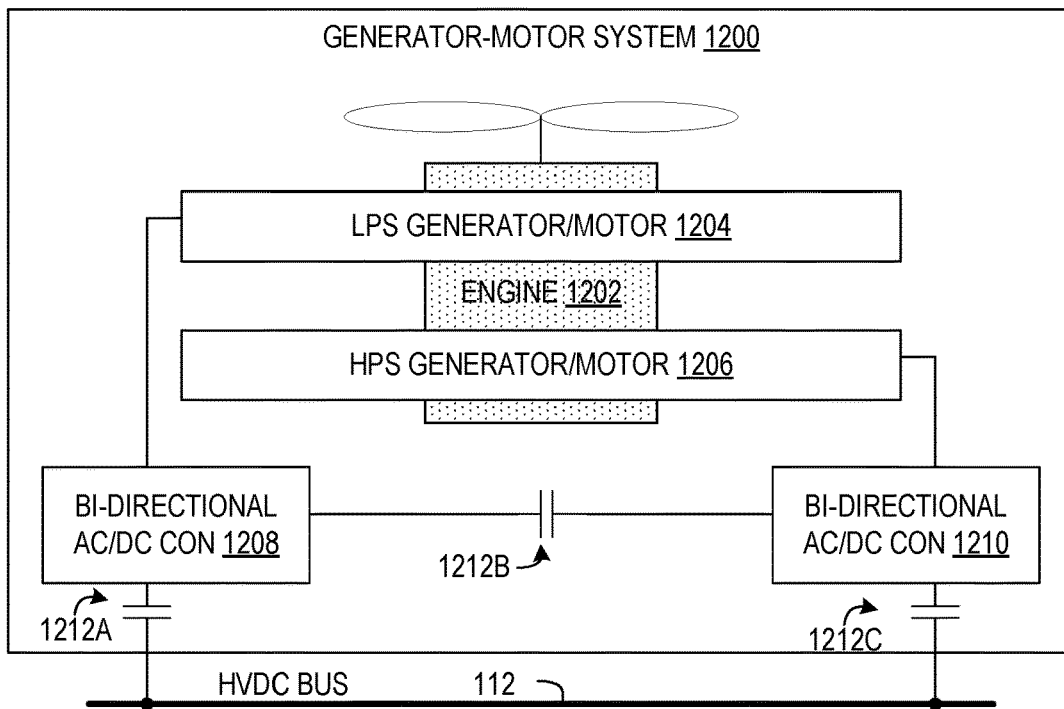
FIG. 12 shows a block diagram of an example generator-motor system that utilizes co-shaft coupling.

Alternatively, a generator-motor system can utilize co-shaft coupling. FIG. 12 depicts a block diagram of such an example generator-motor system 1200. Generator-motor system 1200 is an example implementation of generator-motor system 120 and as such, is depicted as connected to HVDC bus 112. Similar to generator-motor system 1100, generator-motor system 1200 includes an engine 1202, an LPS generator/motor 1204, an HPS generator/motor 1206, a first AC/DC converter 1208, a second AC/DC converter 1210, and a plurality of switchgear hardware 1212. In contrast, LPS generator/motor 1204 and HPS generator/motor 1206 are configured for co-shaft coupling with engine 1202. Such a configuration can in some cases reduce the number of components of generator-motor system 1200.

Figure 14:
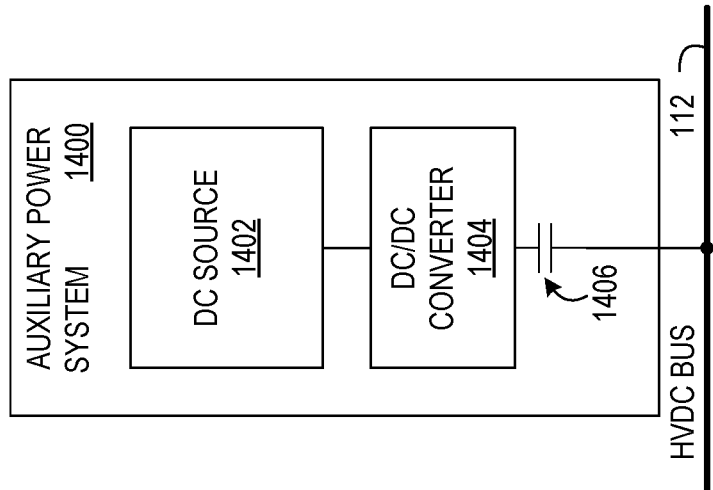
FIG. 14 shows a block diagram of an example auxiliary power system having a DC power source.
Figure 13:
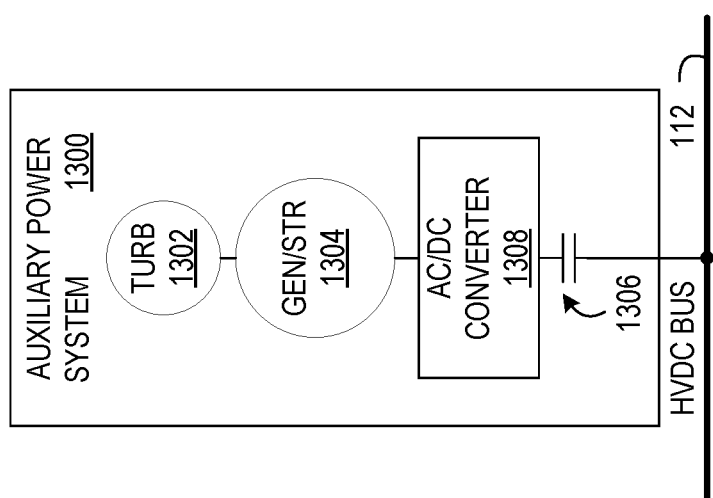
FIG. 13 shows a block diagram of an example auxiliary power system having a non-propulsive turbine.

As previously mentioned, an aircraft can have an auxiliary power system that is a non-propulsive power source to help provide additional electric power, as illustrated in FIGS. 13 and 14. FIG. 13 depicts a block diagram of an example auxiliary power system 1300 including a turbine 1302. Auxiliary power system 1300 is an example implementation of auxiliary power system 132. As such, auxiliary power system 1300 is depicted as connected to HVDC bus 112. Auxiliary power system 1300 includes a generator/starter 1304 connected to turbine 1302. In a first operating mode, turbine 1302 operates as a gas turbine that drives generator/starter 1304 for electric power generation. In a second operating mode, generator/starter 1304 is used to start turbine 1302. A switchgear 1306 is configured to change a state of a connection between an AC/DC converter 1308 and HVDC bus 112.

Alternatively or additionally, an auxiliary power system 1400 includes a DC power source 1402 connected to a DC/DC converter 1404, as illustrated in FIG. 14. Auxiliary power system 1400 is an example implementation of auxiliary power system 132. As such, auxiliary power system 1400 is depicted as connected to HVDC bus 112. DC power source 1402 can include a battery, a fuel cell, or any other suitable DC power source. A switchgear 1406 is configured to change a state of the connection between DC/DC converter 1404 and HVDC bus 112. In such a manner, DC power source 1402 can help to provide additional power to HVDC bus 112 with less carbon emissions than a gas-turbine based auxiliary power system.

Figure 15:
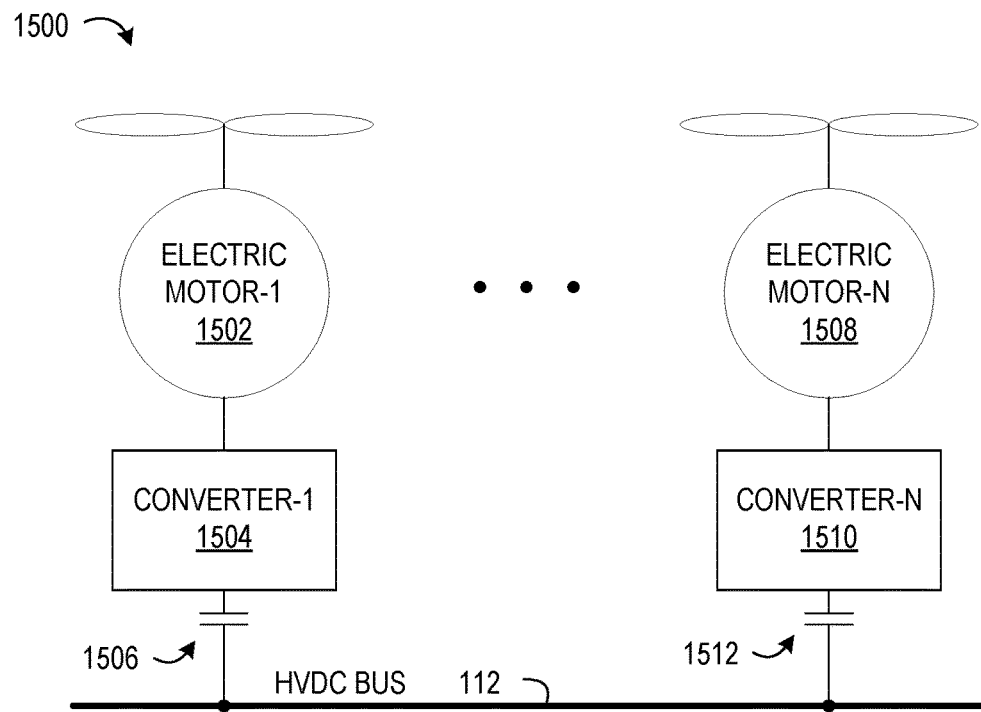
FIG. 15 schematically shows an example electric motor configuration.

Electric motors can help to reduce carbon emissions for aircraft utilizing a hybrid power system. FIG. 15 depicts a block diagram of an example electric motor configuration 1500 utilizing a plurality of electric motors. Electric motor configuration 1500 can be used by hybrid power system 102, for example. Electric motor configuration 1500 has a first electric motor 1502 connected to a first converter 1504. First converter 1504 is configured to convert between electric power for first electric motor 1502 and HVDC bus 112. Further, a first switchgear 1506 is configured to change a state of a connection between first converter 1504 and HVDC bus 112. In a similar manner, electric motor configuration 1500 further has an Nth electric motor 1508, an Nth converter 1510, and an Nth switchgear 1512. As used herein, "N" indicates any suitable number of additional electric motors, converters, and switchgear hardware. In such a manner, electric motor configuration 1500 can help to enable distributed propulsion on an aircraft. In other examples, a single electric motor, converter, and switchgear can be used.

Figure 16:
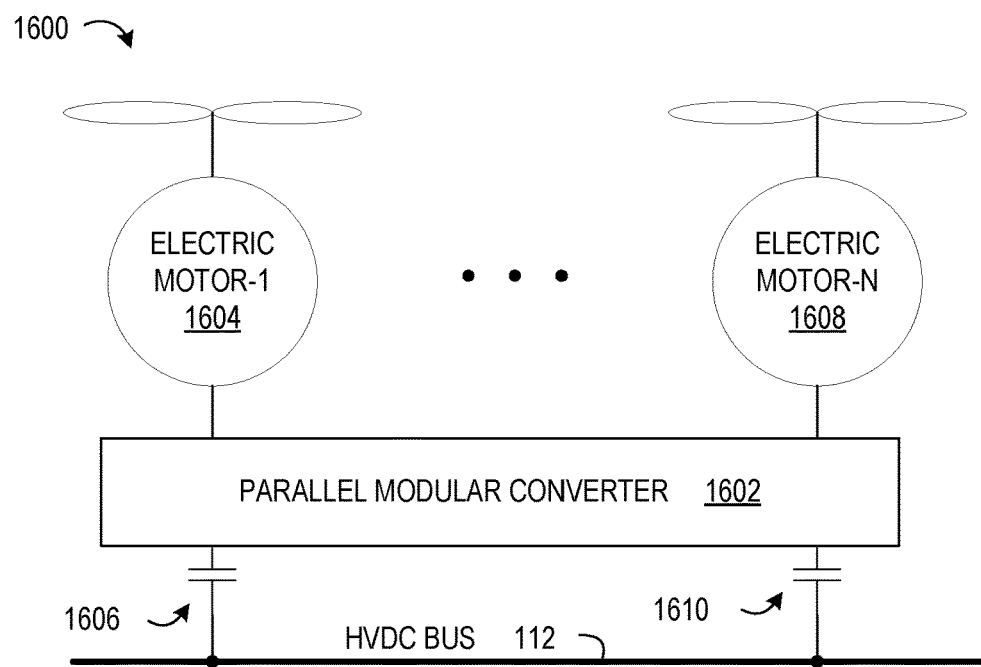
FIG. 16 schematically shows an example electric motor configuration utilizing a parallel modular converter.

Alternatively or additionally, a plurality of electric motors can utilize a shared converter. FIG. 16 depicts a block diagram of an example electric motor configuration 1600 having a parallel modular converter 1602. Electric motor configuration 1600 can be used by hybrid power system 102, for example. Similar to electric motor configuration 1500, electric motor configuration 1600 has a first electric motor 1604, a first switchgear 1606, an Nth electric motor 1608, and an Nth switchgear 1610. In contrast, first electric motor 1604 and Nth electric motor 1608 are connected to parallel modular converter 1602. Parallel modular converter 1602 is configured to convert between electric power of one or more of first and Nth electric motors 1604, 1608 and HVDC bus 112. Electric motor configurations 1500 and 1600 are illustrative, and other suitable electric motor configuration can be used.

Figure 17:
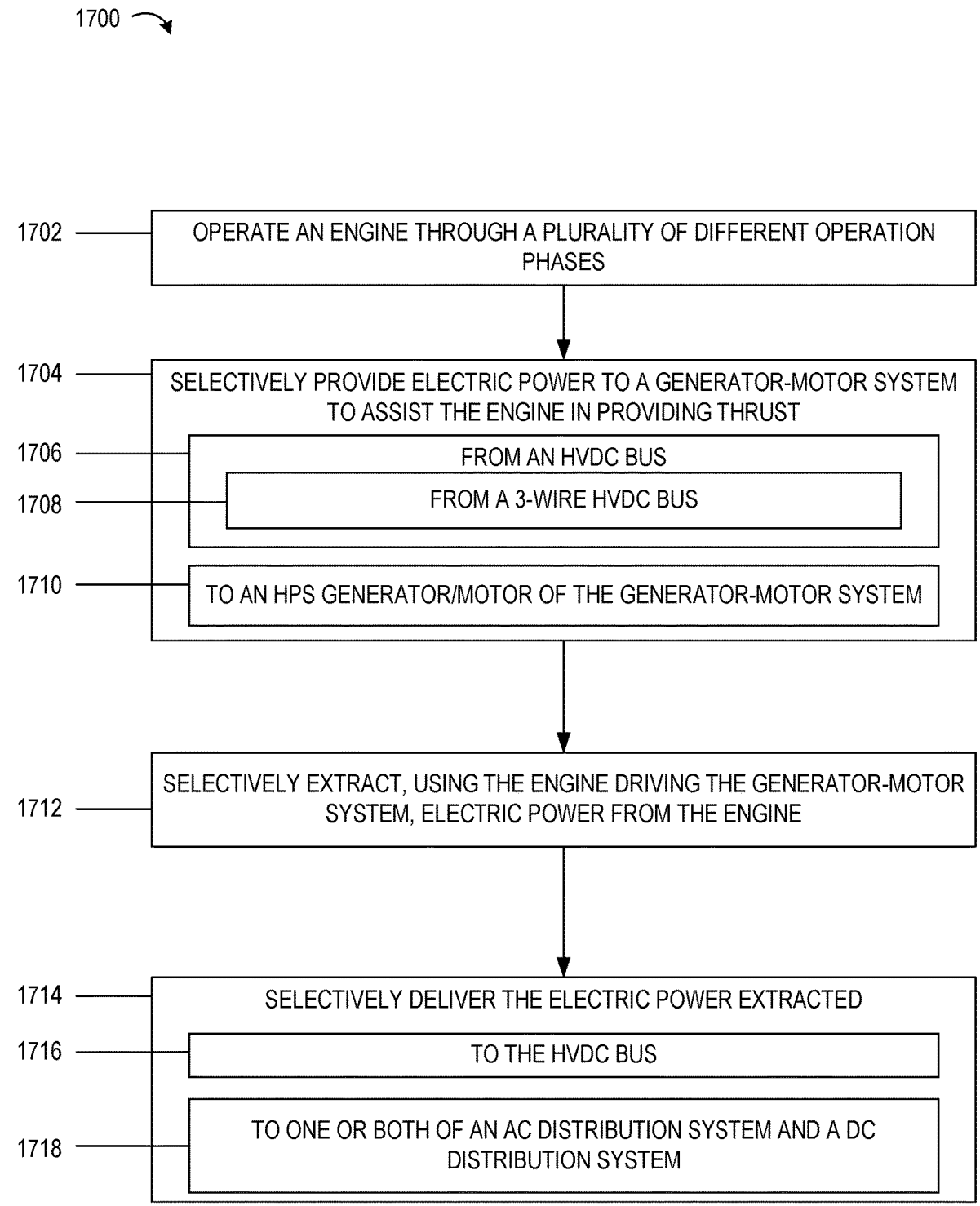
FIG. 17 illustrates a flow diagram of an example method for operating a hybrid power system on an aircraft.

FIG. 17 depicts a flow diagram of an example method 1700 for operating a hybrid power system having an engine and a generator-motor system connected to an HVDC bus. Method 1700 can be performed on airplane 100, for example. Method 1700 comprises, at 1702, operating an engine through a plurality of different operation phases. Examples of the operation phases include ground operations (including taxiing), generator/engine starts, a take-off-and-climb operation phase, a cruising operation phase, and a descent-and-approach operation phase. The engine has an HPS shaft coupled with an HPS generator/motor of the generator-motor system and an LPS shaft coupled with an LPS generator/motor of the generator-motor system. Continuing, operating the engine includes generating thrust via a turbofan engine fan and nozzle exhaust.

Method 1700 comprises, at 1704, selectively providing, based on thrust demands of the engine, electric power to the generator-motor system to assist the engine in providing thrust. The electric power can be provided from the HVDC bus, as indicated at 1706. In some examples, the HVDC bus comprises a 3-wire HVDC bus, as indicated at 1708. Alternatively or additionally, the electric power can be provided to the HPS generator/motor to drive the HPS shaft, as indicated at 1710. In some examples, the electric power is provided in an amount that is variable based on thrust demands of the engine. Alternatively or additionally, the amount can be based on a current one of the plurality of different operation phases, desired engine idle speed, engine stability/stall margins, and/or optimized engine compressor size.

In examples where the aircraft has an electric motor, method 1700 further comprises selectively using the electric motor to alternately (1) provide thrust for the aircraft, and (2) provide electric power to the HVDC bus via regenerative operation of the electric motor. In examples where the aircraft has an auxiliary power unit, method 1700 comprises selectively providing electric power to the HVDC bus from an auxiliary power unit.

Returning, method 1700 comprises, at 1712, selectively extracting, using the engine driving the generator-motor system with one or both of the HPS shaft and the LPS shaft, electric power from the engine. The power extracted from the LPS shaft may be provided to the HPS shaft to assist the engine in providing thrust. Alternatively or additionally, the power extracted from the LPS shaft may be delivered to the HVDC bus for further distribution. In some examples, electric power is transferred between the HPS generator/motor and the LPS generator/motor. More specifically, an amount of electric power transferred between the HPS generator/motor and the LPS generator/motor can be based on electric power and thrust demands of the aircraft.

Continuing, method 1700 comprises, at 1714, selectively delivering the electric power extracted from the engine. The electric power extracted is delivered to the HVDC bus, as indicated at 1716. The electric power extracted may further be distributed to one or both of an AC distribution system and a DC distribution system, as indicated at 1718. In examples where the HVDC bus is a 3-wire HVDC bus, the electric power is delivered to a first AC distribution system using a first 2-wire HVDC bus having positive and neutral wires of the 3-wire HVDC bus. In such examples, the electric power is further delivered to a second AC distribution system using a second 2-wire HVDC bus having neutral and negative wires of the 3-wire HVDC bus.

In some examples, method 1700 may comprise selectively providing electric power from the DC distribution system to the generator-motor system using the HVDC bus. As a specific example, the electric power is provided to the HPS generator/motor to drive the HPS shaft of the engine. In some such examples, a high-voltage battery of the DC distribution system provides the electric power to the HVDC bus. In other such examples, a low-voltage battery and a voltage converter of the DC distribution system may provide the electric power to the HVDC bus.

When method 1700 selective provides and/or delivers electric power from/to the HVDC bus, method 1700 comprises controlling a corresponding electrical connection with the HVDC bus using a contactor.

In such a manner, electric power can be provided to and/or extracted from a generator-motor system of a hybrid power system for an aircraft. Providing power to an engine of the aircraft helps to reduce a size of some engine components (e.g., core compressor), which helps to improve engine efficiency and reduce fuel consumption. Extracting power from the engine may drag down the engine speed and reduce stall/stability margins at low idle speeds. Therefore, boosting engine performance using engine assist can help when operating the engine at otherwise normally low speeds, such as on the ground (e.g., taxi) and during approach-and-descent operation phases, for example. An engine that allows for power extraction from the more efficient spool in some conditions, and also has power assist in low-speed conditions may help to improve stability margin of the engine, and thus helps to enable smaller engine sizing and/or reduced fuel consumption during those operation phases.

Aircraft having a hybrid power system as disclosed herein can beneficially control distribution, production, consumption, and storage of electric power on the aircraft. More specifically, the hybrid power system may improve an engine performance of the hybrid power system and/or lower a fuel consumption of the aircraft. Further, the hybrid power system utilizes an HVDC power distribution that can help to integrate electric motors and/or legacy utility and avionics equipment of an aircraft.

Further, the disclosure comprises configurations according to the following clauses.

Clause 1. A hybrid power system for an aircraft, the hybrid power system comprising: a high-voltage DC (HVDC) bus; a generator-motor system configured to (1) selectively receive electric power from the HVDC bus to assist an engine of the aircraft in providing propulsion and (2) provide electric power to the HVDC bus during regulated power extraction from the engine, wherein the generator-motor system includes: a low-pressure spool (LPS) generator/motor coupled with an LPS shaft of the engine; a high-pressure spool (HPS) generator/motor coupled with an HPS shaft of the engine; a first AC/DC converter connected to the LPS generator/motor and the HVDC bus; and a second AC/DC converter connected to the HPS generator/motor, the first AC/DC converter, and the HVDC bus; an electric motor connected to the HVDC bus and configured to provide one or more of propulsion and electric power; an AC distribution system connected to the HVDC bus; a DC distribution system connected to HVDC bus; and a control system configured to selectively control a state of a connection to the HVDC bus of one or more of the first AC/DC converter, the second AC/DC converter, the electric motor, the AC distribution system, and the DC distribution system.

Clause 2. The hybrid power system of clause 1, wherein the HVDC bus includes a 3-wire HVDC bus having a positive bus, a neutral bus, and a negative bus.

Clause 3. The hybrid power system of clause 2, wherein the AC distribution system includes: a 2-wire HVDC bus including the neutral bus and either the positive bus or the negative bus; and a parallel modular converter-controller configured to convert the 2-wire HVDC bus to a 3-phase AC bus.

Clause 4. The hybrid power system of clause 3, wherein the AC distribution system further includes a transformer.

Clause 5. The hybrid power system of clause 1, wherein the AC distribution system is a first AC distribution system, and further comprising a second AC distribution system connected to the HVDC bus.

Clause 6. The hybrid power system of clause 1, wherein the electric motor is a first electric motor, and further comprising: a first converter connected between the first electric motor and the HVDC bus; a second electric motor configured to provide one or more of propulsion and electric power; and a second converter connected between the second electric motor and the HVDC bus.

Clause 7. The hybrid power system of clause 1, wherein the electric motor is a first electric motor, and further comprising: a second electric motor; and a parallel modular converter connected to the first electric motor, the second electric motor, and the HVDC bus.

Clause 8. The hybrid power system of clause 1, wherein the DC distribution system includes a high-voltage battery configured to be selectively coupled to the generator-motor system through the HVDC bus to provide an electric engine assist.

Clause 9. A hybrid power system for an aircraft, the hybrid power system comprising: a high-voltage DC (HVDC) bus; a generator-motor system configured to (1) selectively receive electric power from the HVDC bus to assist an engine of the aircraft in providing propulsion and (2) provide electric power to the HVDC bus during regulated power extraction from the engine, wherein the generator-motor system includes: a low-pressure spool (LPS) generator/motor coupled with an LPS shaft of the engine; a high-pressure spool (HPS) generator/motor coupled with an HPS shaft of the engine; a first AC/DC converter connected to the LPS generator/motor and the HVDC bus; and a second AC/DC converter connected to the HPS generator/motor, the first AC/DC converter, and the HVDC bus; an AC distribution system connected to the HVDC bus; a DC distribution system connected to HVDC bus; and a control system configured to selectively control a state of a connection to the HVDC bus of one or more of the first AC/DC converter, the second AC/DC converter, the AC distribution system, and the DC distribution system.

Clause 10. The hybrid power system of clause 9, wherein the HVDC bus includes a 3-wire HVDC bus having a positive bus, a neutral bus, and a negative bus.

Clause 11. The hybrid power system of clause 10, wherein the AC distribution system includes: a 2-wire HVDC bus including the neutral bus and either the positive bus or the negative bus; and a parallel modular converter-controller configured to convert the 2-wire HVDC bus to a 3-phase AC bus.

Clause 12. The hybrid power system of clause 9, wherein the AC distribution system is a first AC distribution system, and further comprising a second AC distribution system connected to the HVDC bus.

Clause 13. The hybrid power system of clause 9, wherein the DC distribution system includes a high-voltage battery configured to be selectively coupled to the generator-motor system through the HVDC bus to provide an electric engine assist.

Clause 14. An aircraft comprising: an engine; a hybrid power system including: a high-voltage DC (HVDC) bus; a generator-motor system configured to (1) selectively receive electric power from the HVDC bus to assist the engine in providing propulsion and (2) provide electric power to the HVDC bus during regulated power extraction from the engine, wherein the generator-motor system includes: a low-pressure spool (LPS) generator/motor coupled with an LPS shaft of the engine; a high-pressure spool (HPS) generator/motor coupled with an HPS shaft of the engine; a first AC/DC converter connected to the LPS generator/motor and the HVDC bus; and a second AC/DC converter connected to the HPS generator/motor, the first AC/DC converter, and the HVDC bus; an AC distribution system connected to the HVDC bus; a DC distribution system connected to HVDC bus; and a controller configured to selectively control a state of connection to the HVDC bus of one or more of the first AC/DC converter, the second AC/DC converter, the AC distribution system, and the DC distribution system.

Clause 15. The aircraft of clause 14, wherein the hybrid power system further includes an electric motor connected to the HVDC bus and configured to provide one or more of propulsion and electric power.

Clause 16. The aircraft of clause 14, wherein the HVDC bus includes a 3-wire HVDC bus having a positive bus, a neutral bus, and a negative bus.

Clause 17. The aircraft of clause 16, wherein the AC distribution system includes: a 2-wire HVDC bus including the neutral bus and either the positive bus or the negative bus; and a parallel modular converter-controller configured to convert the 2-wire HVDC bus to a 3-phase AC bus.

Clause 18. The aircraft of clause 14, wherein the AC distribution system is a first AC distribution system, and further comprising a second AC distribution system connected to the HVDC bus.

Clause 19. The aircraft of clause 14, wherein the AC distribution system further includes a transformer.

Clause 20. The aircraft of clause 14, wherein the DC distribution system includes a high-voltage battery configured to be selectively coupled to the generator-motor system through the HVDC bus to provide an electric engine assist.

The invention claimed is:

1. A hybrid power system for an aircraft, the hybrid power system comprising:
   a high-voltage DC (HVDC) bus;
   a generator-motor system configured to (1) selectively receive electric power from the HVDC bus to assist an engine of the aircraft in providing propulsion and (2) provide electric power to the HVDC bus during regulated power extraction from the engine, wherein the generator-motor system includes:
      a low-pressure spool (LPS) generator/motor coupled with an LPS shaft of the engine;
      a high-pressure spool (HPS) generator/motor coupled with an HPS shaft of the engine;
      a first AC/DC converter connected to the LPS generator/motor and the HVDC bus; and
      a second AC/DC converter connected to the HPS generator/motor, the first AC/DC converter, and the HVDC bus;
   an electric motor connected to the HVDC bus and configured to provide one or more of propulsion and electric power;
   an AC distribution system connected to the HVDC bus;
   a DC distribution system connected to HVDC bus; and
   a control system configured to selectively control a state of a connection to the HVDC bus of one or more of the first AC/DC converter, the second AC/DC converter, the electric motor, the AC distribution system, and the DC distribution system.

2. The hybrid power system of claim 1, wherein the HVDC bus includes a 3-wire HVDC bus having a positive bus, a neutral bus, and a negative bus.

3. The hybrid power system of claim 2, wherein the AC distribution system includes:
   a 2-wire HVDC bus including the neutral bus and either the positive bus or the negative bus; and
   a parallel modular converter-controller configured to convert the 2-wire HVDC bus to a 3-phase AC bus.

4. The hybrid power system of claim 3, wherein the AC distribution system further includes a transformer.

5. The hybrid power system of claim 1, wherein the AC distribution system is a first AC distribution system, and further comprising a second AC distribution system connected to the HVDC bus.

6. The hybrid power system of claim 1, wherein the electric motor is a first electric motor, and further comprising:
   a first converter connected between the first electric motor and the HVDC bus;
   a second electric motor configured to provide one or more of propulsion and electric power; and
   a second converter connected between the second electric motor and the HVDC bus.

7. The hybrid power system of claim 1, wherein the electric motor is a first electric motor, and further comprising:
   a second electric motor; and
   a parallel modular converter connected to the first electric motor, the second electric motor, and the HVDC bus.

8. The hybrid power system of claim 1, wherein the DC distribution system includes a high-voltage battery configured to be selectively coupled to the generator-motor system through the HVDC bus to provide an electric engine assist.

9. A hybrid power system for an aircraft, the hybrid power system comprising:
   a high-voltage DC (HVDC) bus;
   a generator-motor system configured to (1) selectively receive electric power from the HVDC bus to assist an engine of the aircraft in providing propulsion and (2) provide electric power to the HVDC bus during regulated power extraction from the engine, wherein the generator-motor system includes:
      a low-pressure spool (LPS) generator/motor coupled with an LPS shaft of the engine;

a high-pressure spool (HPS) generator/motor coupled with an HPS shaft of the engine;
a first AC/DC converter connected to the LPS generator/motor and the HVDC bus; and
a second AC/DC converter connected to the HPS generator/motor, the first AC/DC converter, and the HVDC bus;
an AC distribution system connected to the HVDC bus;
a DC distribution system connected to HVDC bus; and
a control system configured to selectively control a state of a connection to the HVDC bus of one or more of the first AC/DC converter, the second AC/DC converter, the AC distribution system, and the DC distribution system.

10. The hybrid power system of claim 9, wherein the HVDC bus includes a 3-wire HVDC bus having a positive bus, a neutral bus, and a negative bus.

11. The hybrid power system of claim 10, wherein the AC distribution system includes:
a 2-wire HVDC bus including the neutral bus and either the positive bus or the negative bus; and
a parallel modular converter-controller configured to convert the 2-wire HVDC bus to a 3-phase AC bus.

12. The hybrid power system of claim 9, wherein the AC distribution system is a first AC distribution system, and further comprising a second AC distribution system connected to the HVDC bus.

13. The hybrid power system of claim 9, wherein the DC distribution system includes a high-voltage battery configured to be selectively coupled to the generator-motor system through the HVDC bus to provide an electric engine assist.

14. An aircraft comprising:
an engine;
a hybrid power system including:
a high-voltage DC (HVDC) bus;
a generator-motor system configured to (1) selectively receive electric power from the HVDC bus to assist the engine in providing propulsion and (2) provide electric power to the HVDC bus during regulated power extraction from the engine, wherein the generator-motor system includes:
a low-pressure spool (LPS) generator/motor coupled with an LPS shaft of the engine;
a high-pressure spool (HPS) generator/motor coupled with an HPS shaft of the engine;
a first AC/DC converter connected to the LPS generator/motor and the HVDC bus; and
a second AC/DC converter connected to the HPS generator/motor, the first AC/DC converter, and the HVDC bus;
an AC distribution system connected to the HVDC bus;
a DC distribution system connected to HVDC bus; and
a controller configured to selectively control a state of connection to the HVDC bus of one or more of the first AC/DC converter, the second AC/DC converter, the AC distribution system, and the DC distribution system.

15. The aircraft of claim 14, wherein the hybrid power system further includes an electric motor connected to the HVDC bus and configured to provide one or more of propulsion and electric power.

16. The aircraft of claim 14, wherein the HVDC bus includes a 3-wire HVDC bus having a positive bus, a neutral bus, and a negative bus.

17. The aircraft of claim 16, wherein the AC distribution system includes:
a 2-wire HVDC bus including the neutral bus and either the positive bus or the negative bus; and
a parallel modular converter-controller configured to convert the 2-wire HVDC bus to a 3-phase AC bus.

18. The aircraft of claim 14, wherein the AC distribution system is a first AC distribution system, and further comprising a second AC distribution system connected to the HVDC bus.

19. The aircraft of claim 14, wherein the AC distribution system further includes a transformer.

20. The aircraft of claim 14, wherein the DC distribution system includes a high-voltage battery configured to be selectively coupled to the generator-motor system through the HVDC bus to provide an electric engine assist.

* * * * *